United States Patent [19]
Akira et al.

[11] Patent Number: 5,816,351
[45] Date of Patent: Oct. 6, 1998

[54] COOLING STRUCTURE FOR CONSTRUCTION MACHINES

[75] Inventors: Tatsumi Akira, Ibaraki-ken, Japan; Gianni Duri, Bologna; Dario Prealta, Turin, both of Italy

[73] Assignee: Fiat-Hitachi Excavators S.p.A., San Mauro Torinese, Italy

[21] Appl. No.: 625,590

[22] Filed: Mar. 28, 1996

[30] Foreign Application Priority Data

Mar. 31, 1995 [JP] Japan .................................... 7-076059

[51] Int. Cl.[6] .................................................. B60K 11/08
[52] U.S. Cl. ...................................... 180/68.1; 180/69.22
[58] Field of Search .............................. 180/68.1, 68.2, 180/68.4, 68.6, 69.22, 69.25; 123/41.31, 41.51

[56] References Cited

U.S. PATENT DOCUMENTS

| | | | |
|---|---|---|---|
| 1,183,670 | 5/1916 | Riker | 180/68.1 |
| 3,923,114 | 12/1975 | Suzuki | 180/68.1 |
| 4,562,895 | 1/1986 | Kirchweger | 180/68.1 |
| 5,526,872 | 6/1996 | Gielda et al. | 180/68.1 |

FOREIGN PATENT DOCUMENTS

| | | | |
|---|---|---|---|
| 3910560 | 10/1990 | Germany | 180/68.4 |
| 57-83019 U | of 0000 | Japan. | |
| 62-78325 U | 5/1987 | Japan | F01P 11/10 |
| 1-182123 | 7/1989 | Japan | 180/68.4 |
| 3-220023 | 9/1991 | Japan | 180/69.22 |
| 831597 | 3/1960 | United Kingdom | 180/68.1 |
| 92/12023 | 7/1992 | WIPO | 180/68.6 |

*Primary Examiner*—Brian L. Johnson
*Assistant Examiner*—Frank Vanaman
*Attorney, Agent, or Firm*—Larry W. Miller; J. William Stader; Frank A. Seemar

[57] ABSTRACT

A cooling structure for a construction machine is disclosed to minimize the occurrence of a turbulent flow of air, provide a better cooling ability, and reduce surroundings noise. A recess is formed in a portion of an engine cover above a front portion of an engine, and exhaust ports are formed in a slope of the recess on the same side as a fan. A space having a proper size is thereby defined among a portion of the engine cover, which is positioned radially outside the fan, the exhaust ports and the fan. That portion of the engine cover constitutes a first guide for guiding the cooling air just after having passed the fan, as a laminar flow, to the exhaust ports, and an opposite slope of the recess constitutes a second guide for guiding the cooling air discharged through the exhaust ports as a laminar flow. A distal end of the second guide is positioned lower than the first guide, and the exhaust ports each provided between the distal end of the second guide and a distal end of the first guide are positioned across the cooling air supplied from the fan as a laminar flow.

9 Claims, 8 Drawing Sheets

COOLING STRUCTURE FOR CONSTRUCTION MACHINES

BACKGROUND OF THE INVENTION

The present invention relates to a cooling structure for construction machines such as hydraulic excavators, and more particularly to a cooling structure for construction machines wherein an engine is mounted transversely in a machine room, open air is sucked by a fan rotated by the engine to cool a radiator, and cooling air after being used for the cooling is discharged through an engine cover at the top of the machine room.

In construction machines such as hydraulic excavators, an engine, a fan attached to the engine, an oil cooler, a radiator and so on are generally installed in a machine room. Open air sucked by the fan for cooling the engine first cools the oil cooler and the radiator, and is then introduced to the rear side of the engine through a passage between an upper surface of the engine and an engine cover for cooling the machine room, especially, an engine room as primary part of the machine room. Hot air after being used for the cooling is discharged to the outside through exhaust ports formed in an upper wall of the engine cover and a door of a pump room as part of the machine room.

The prior art relating to the cooling structure for construction machines is disclosed in, e.g., JP, U, 57-83019 and JP, U, 62-78325.

JP, U, 57-83019 describes a cooling mechanism for a tractor including an engine mounted longitudinally in a machine room which has exhaust ports formed in left and right side panels thereof, wherein a first exhaust plate is provided and inclined inside each of the side panels so that hot air having cooled a radiator after being sucked by a fan and flowing toward the rear side of the engine is discharged to the outside of the machine room through the exhaust ports, and a second exhaust plate is provided in a space between the left and right side panels and a front axle bearing base so that hot air flowing downward in the space is discharged to the outside of the machine room through below the left and right side panels.

JP, U, 62-78325 describes a cooling structure including a first exhaust port formed in an upper wall of an engine room for discharging hot air having cooled a radiator after being sucked by a fan and flowing toward the rear side of an engine therethrough, and a second exhaust port formed in the upper wall of the engine room for discharging hot air in the direction of colliding a stream of the hot air discharged through the first exhaust port.

SUMMARY OF THE INVENTION

However, the above-mentioned prior art has problems below. From the viewpoint of sufficiently cooling an oil cooler, a radiator, etc. and improving the heat balance of a machine body, it is desired to enlarge the area of exhaust ports for hot air. But if the area of exhaust ports is enlarged, noise in a machine room is leaked to the surroundings, which results in loud surroundings noise. For this reason, there is a limit in the area of exhaust ports. In a hydraulic excavator, generally, a machine room is designed to occupy a minimum space for reducing the radius of swing, and a passage defined between an engine upper surface and an engine cover at the top of the machine room is narrow. Therefore, the flow resistance imposed on the hot air until it is discharged through the exhaust ports after passing through an engine room is so large that a sufficient cooling ability cannot be obtained.

Enlarging the area of exhaust ports reduces the flow resistance, but increases the surroundings noise as mentioned above. Further, because the exhaust ports are holes bored in an upper wall of the engine cover, the direction of the exhaust ports is not aligned with the direction of stream of the hot air and a turbulent flow of air occurs within the engine room, resulting in poor exhaust efficiency with respect to the area of exhaust ports. Simultaneously, turbulent flow sounds also occur. In addition, exhaust ports having a large area cannot be formed on the pump room side, particularly, for the purpose of reducing the surroundings noise. Therefore, a turbulent flow of air occurs near the exhaust ports as well, causing turbulent flow sounds.

In the cooling structure described in JP, U, 57-83019, since the first exhaust plate (guide) is provided and inclined inside each of the left and right side panels of the machine room so that the hot air having cooled the radiator after being sucked by the fan and flowing toward the rear side of the engine is discharged to the outside of the machine room through the exhaust ports in the side plate, the hot air can be more easily discharged through the exhaust ports. However, this prior art includes no appropriate guides in a space through which the hot air having passed the fan flows to the first exhaust plate, and hence has a structure tending to easily cause a turbulent flow of air. Further, this prior art is intended for a construction machine with an engine mounted longitudinally in a machine room. In other words, this prior art cannot be applied to a construction machine with a transversely mounted engine wherein sides of a machine room are enclosed by a cab, etc. on the front side and by a counterweight on the rear side.

In the cooling structure described in JP, U, 62-78325, the exhaust ports are holes bored in the upper wall of the engine cover, and the direction of the exhaust ports is not aligned with the direction of stream of the hot air. Thus, this prior art cannot solve the problem of causing a turbulent flow of air within the engine room. Also, this prior art requires a number of louvers attached to an outer surface of the engine cover, resulting in the complicated structure.

An object of the present invention is to provide a cooling structure for a construction machine which minimizes the occurrence of a turbulent flow of air, has a better cooling ability, and reduces surroundings noise.

To achieve the above object, the present invention is arranged as follows. Specifically, in a cooling structure for a construction machine wherein an engine is mounted transversely in a machine room, open air is sucked by a fan rotated by the engine to cool a radiator, and cooling air after being used for the cooling is discharged through an engine cover at the top of the machine room, the cooling structure includes exhaust ports formed in a portion of the engine cover above a front portion of the engine, a first guide positioned radially outside the fan for guiding the cooling air just after having passed the fan, as a laminar flow, to the exhaust ports, and a second guide positioned above the front portion of the engine for guiding the cooling air discharged through the exhaust ports as a laminar flow, the second guide having a distal end positioned lower than the first guide, the exhaust ports being each positioned between the distal end of the second guide and a distal end of the first guide.

Preferably, the second guide is inclined downward toward the fan. Also preferably, the first guide is constituted by a portion of the engine cover which is positioned radially outside the fan. Also preferably, a sound shielding partition is provided between the exhaust ports in the engine cover and a rear portion of a machine body.

Further preferably, a recess is formed in the portion of the engine cover above the front portion of the engine, the exhaust ports are formed in a slope of the recess on the same side as the fan, and an opposite slope of the recess serves as the second guide. In this case, it is desired that the recess is formed except for a portion of the engine cover adjacent to the rear portion of the machine body, and the portion of the engine cover adjacent to the rear portion of the machine body serves as a sound shielding partition.

Also preferably, the front portion of the engine is cutoff obliquely so that the engine cover is positioned closer to an upper surface of the engine. Also preferably, a third guide is provided outside the engine cover on its upper surface near the exhaust ports so as to cover the exhaust ports. In this case, it is desired that the third guide is inclined such that a passage defined between the third guide and the second guide is gradually narrowed. It is also desired that a sound absorbing material is attached to the inner side of the third guide.

In the present invention arranged as set forth above, with the feature that the exhaust ports are formed in the portion of the engine cover above the front portion of the engine, most of cooling air having passed the fan is discharged near the fan and hence the flow resistance is small. Further, with the arrangement that the first and second guides are provided so as to form a laminar flow and the exhaust ports are positioned across the laminar flow, the cooling air is discharged as a laminar flow through the exhaust ports and hence the flow resistance becomes smaller. In addition, since the amount of cooling air flowing toward the rear side of the engine is reduced, the occurrence of a turbulent flow is suppressed near exhaust ports in the rear side as well. Therefore, the exhaust efficiency is increased, a sufficient cooling ability is obtained, and the occurrence of turbulent flow sounds is suppressed, resulting in less surroundings noise.

With the feature that the second guide is inclined downward toward the fan, the action of guiding the cooling air discharged through the exhaust ports as a turbulent flow is enhanced.

With the feature that the first guide is constituted by a portion of the engine cover which is positioned radially outside the fan, the first guide can be provided with no need of using a special plate member.

With the feature that a sound shielding partition is provided between the exhaust ports in the engine cover and a rear portion of a machine body, noise leaked through the exhaust ports is prevented from spreading toward the rear side of the machine body and hence the effect of reducing surroundings noise is further enhanced.

With the feature that a recess is formed in the portion of the engine cover above the front portion of the engine, the exhaust ports are formed in a slope of the recess on the same side as the fan, and an opposite slope of the recess serves as the second guide, the second guide can be provided by bending part of the engine cover.

With the feature that the recess is formed except for a portion of the engine cover adjacent to the rear portion of the machine body, the portion of the engine cover adjacent to the rear portion of the machine body can be utilized as a sound shielding partition.

With the feature that the front portion of the engine is cut off obliquely so that the engine cover is positioned closer to an upper surface of the engine, the engine cover can be positioned at a lower level while ensuring a required distance between the upper surface of the engine and the lower end of the second guide, and the field of view looking from the cab rearward is improved.

With the feature that a third guide is provided outside the engine cover on its upper surface, the third guide can also serve as a sound shielding plate and a cover for preventing intrusion of rainwater. It is thus possible to further enhance the effect of reducing surroundings noise and prevent rainwater from entering the machine room.

With the feature that the third guide is inclined such that a passage defined between the third guide and the second guide is gradually narrowed, the discharged cooling air is guided as a more complete laminar flow while ensuring a sufficient opening area for discharge. As a result, the cooling ability and the noise reducing effect are both further improved.

With the feature that a sound absorbing material is attached to the inner side of the third guide, noise leaked through the exhaust ports is absorbed by the sound absorbing material and hence the noise reducing effect is further improved.

BRIEF DESCRIPTION OF THE DRAWINGS

A cooling structure for a construction machine in accordance with the present invention will now be described, by way of example, with reference to the accompanying drawings, wherein.

DETAILED DESCRIPTION OF THE PREFERRED EMBODIMENT

A first embodiment of the present invention will be described with reference to FIGS. 1 to 4.

Figure 1:
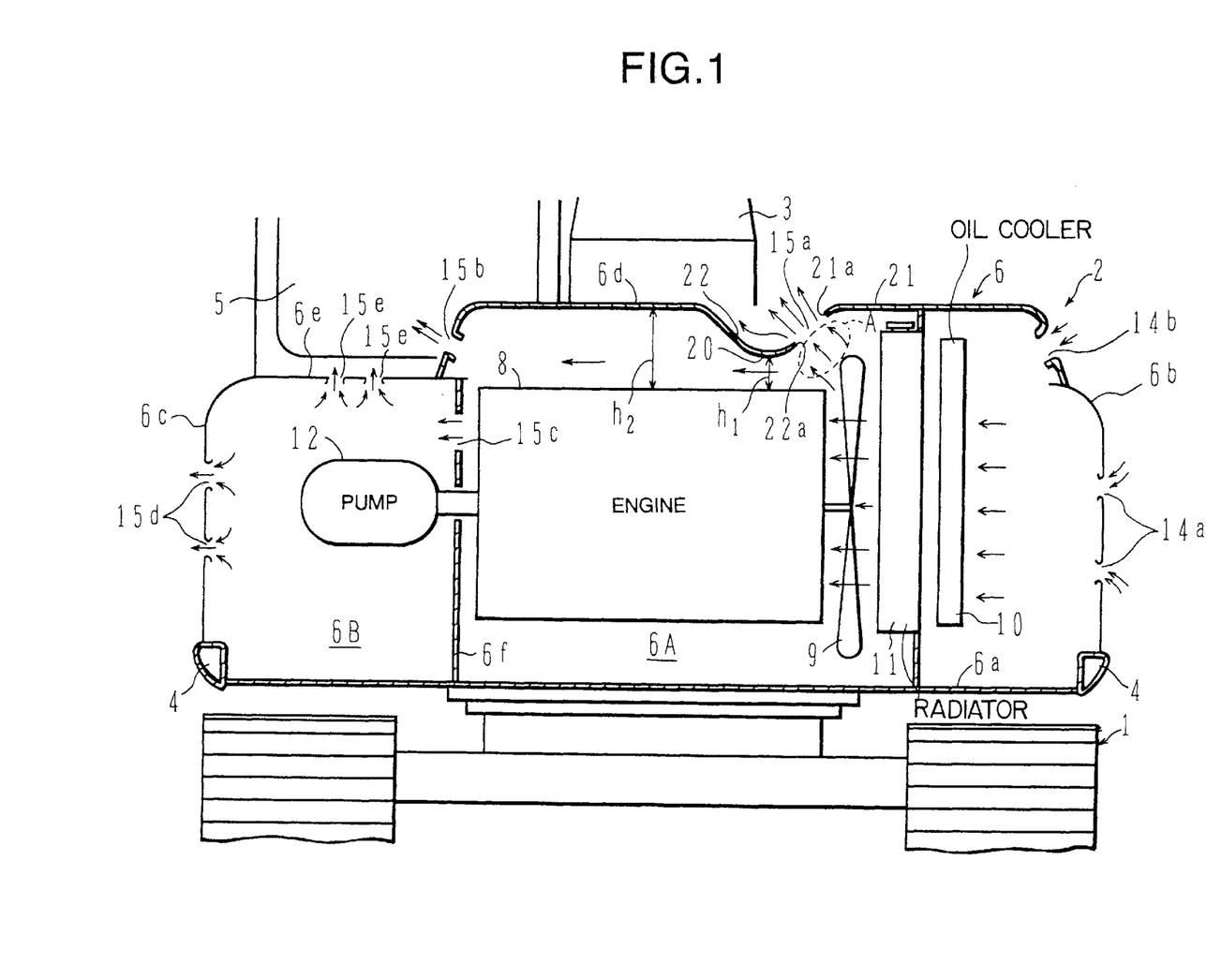
FIG. 1 is a vertical sectional view of a machine room of a hydraulic excavator with a cooling structure according to a first embodiment of the present invention.

In FIG. 1, reference numeral 1 denotes an undercarriage of a hydraulic excavator. An upper structure 2 is swingably mounted on the undercarriage 1, and a front attachment 3 is vertically rotatably attached to a front portion of the upper structure 2. The upper structure 2 mainly comprises a swing frame 4 serving as a skeleton structure, a cab 5 installed in a front portion of the swing frame 4, a machine room 6 installed in a rear portion of the swing frame 4, and a counter weight 7 installed at the rearmost end of the swing frame 4.

The machine room 6 is constructed by a bottom panel 6a, left and right side panels 6b, 6c, an engine cover 6d, and a top panel 6e which are arranged so as to form a box-shaped structure. The interior of the machine room 6 is divided by a partition panel 6f into an engine room 6A and a pump room 6B. An engine 8, a cooling fan 9 attached to the engine 8, an oil cooler 10, a radiator 11, a muffler (not shown) for discharging exhaust gas after combustion in the engine 8, and so on are installed in the engine room 6A. A hydraulic pump 12 driven by the engine 8 to rotate for a hydraulic system, an air cleaner (not shown) for filtering air sucked into the engine 8, and so on are installed in the pump room 6B.

Intake ports 14a, 14b are formed respectively in the side panel 6b defining the engine room 6A of the machine room 6 and a side wall of the engine cover 6d. Exhaust ports 15a, 15b are formed in the engine cover 6d, and openings 15c are formed in the partition panel 6f. Exhaust ports 15d, 15e are formed respectively in the side panel 6c defining the pump room 6B and the top panel 6e. Open air sucked by the fan 9 through the intake ports 14a, 14b cools the oil cooler 10 and the radiator 11, following which it is discharged to the outside through the exhaust ports 15a, 15b, 15d, 15e.

Further, as a structural feature in the cooling structure of this embodiment, a recess 20 is formed in a portion of the engine cover 6d above a front portion of the engine 8, and the exhaust ports 15a are formed in a slope of the recess 20 on the same side as the fan 9. By so forming the exhaust ports 15a, a space A having a proper size is defined among a portion 21 of the engine cover 6d, which is positioned radially outside the fan 9, the exhaust ports 15a and the fan 9. The portion 21 of the engine cover 6d which is positioned radially outside the fan 9 functions as a first guide for guiding the cooling air just after having passed the fan 9, as a laminar flow, to the exhaust ports 15a, and an opposite slope 22 of the recess 20 which is inclined downward toward the fan 9 functions as a second guide for guiding the cooling air discharged through the exhaust ports 15a as a laminar flow.

A distal end 22a of the second guide 22 is positioned lower than the first guide 21, and the exhaust ports 15a are each positioned between the distal end 22a of the second guide 22 and a distal end 21a of the first guide 21 in opposite relation to the space A across the cooling air supplied from the fan 9 as a laminar flow. Additionally, a passage area between an upper surface of the engine 8 and a lower end of the second guide 22 is narrowed by the presence of the recess 20.

With the exhaust ports 15a and the first and second guides 21, 22 arranged as explained above, most of the cooling air having passed the fan 9 is discharged as a laminar flow through the exhaust ports 15a near the fan 9. Because the distance from the fan 9 to the exhaust ports 15a is short and the cooling air is discharged as a laminar flow, the flow resistance is very small. Therefore, even if the area of the exhaust ports 15a is set to be small, the exhaust efficiency is kept high and a sufficient cooling ability is obtained.

On the other hand, part of the cooling air from the fan flows toward the rear side of the engine through the passage between the upper surface of the engine 8 and the lower end of the second guide 22 (the recess 20). At this time, since a flow rate of the cooling air is limited appropriately by the throttling action of the recess 20, the air stream becomes moderate and is discharged through the exhaust ports 15b, 15d, 15e without causing a turbulent flow of air. As a result, the occurrence of turbulent flow sounds is suppressed and surroundings noise is reduced.

Figure 2:
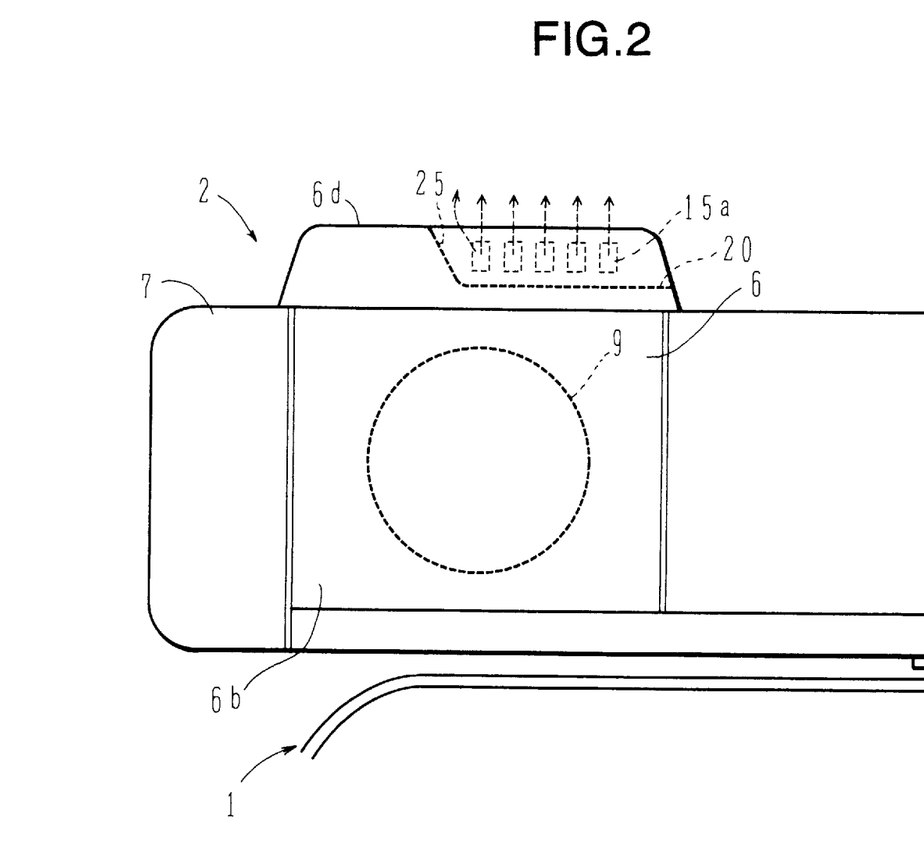
FIG. 2 is a side view of the machine room shown in FIG. 1, the view looking from the engine room side.
Figure 3:
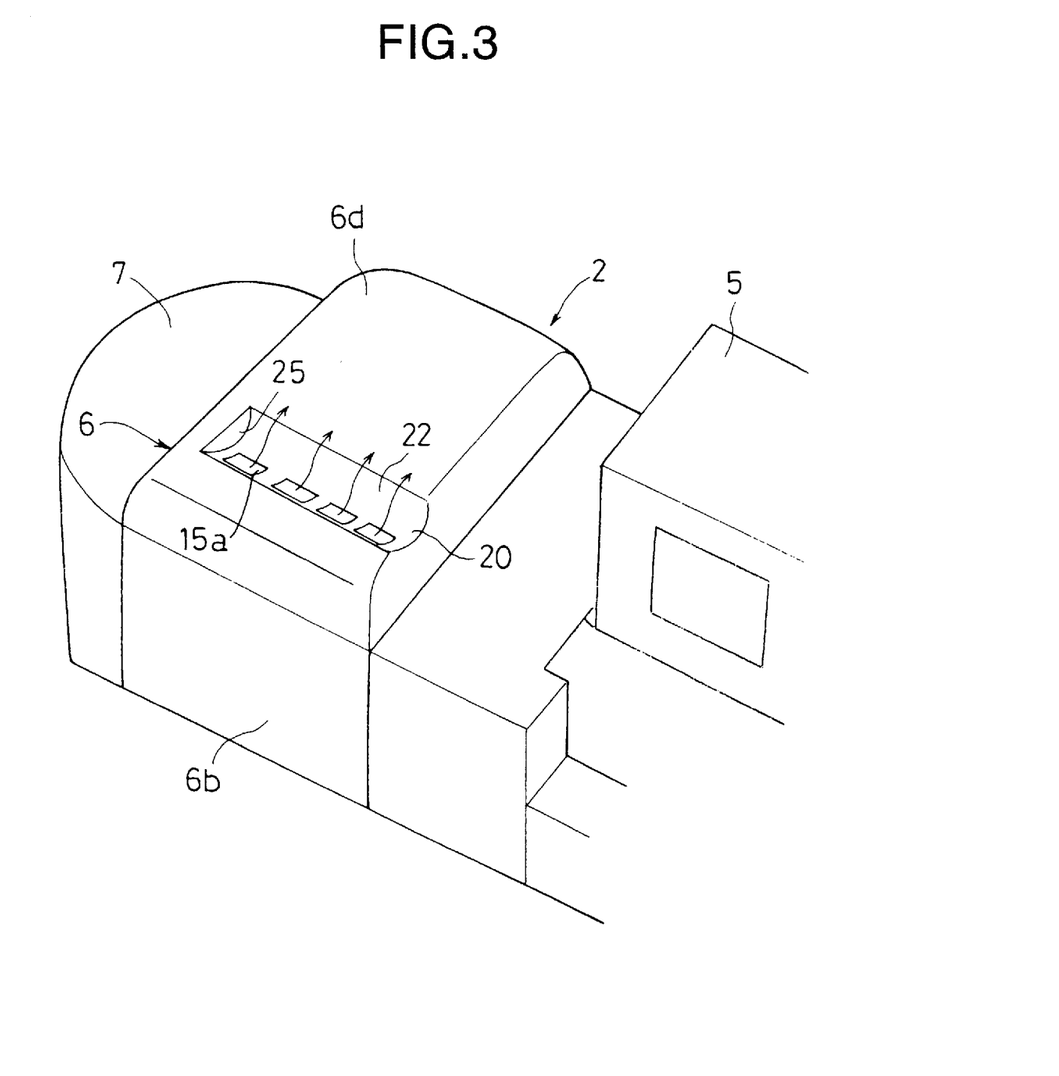
FIG. 3 is a perspective view of a section including the machine room of the hydraulic excavator shown in FIG. 1, the view looking from above obliquely.

Further, as shown in FIGS. 2 and 3, the recess 20 formed in the engine cover 6d is made open at one end in a side wall of the engine cover 6d facing the cab 5, but is terminated halfway on the side near the counterweight 7, leaving a sound shielding partition 25 between the recess 20 in the engine cover 6d and the counterweight 7. This arrangement prevents noise leaked through the exhaust ports 15a from spreading toward the counterweight 7 (rearwardly of the machine body), and hence contributes to further reducing the surroundings noise.

Figure 4:
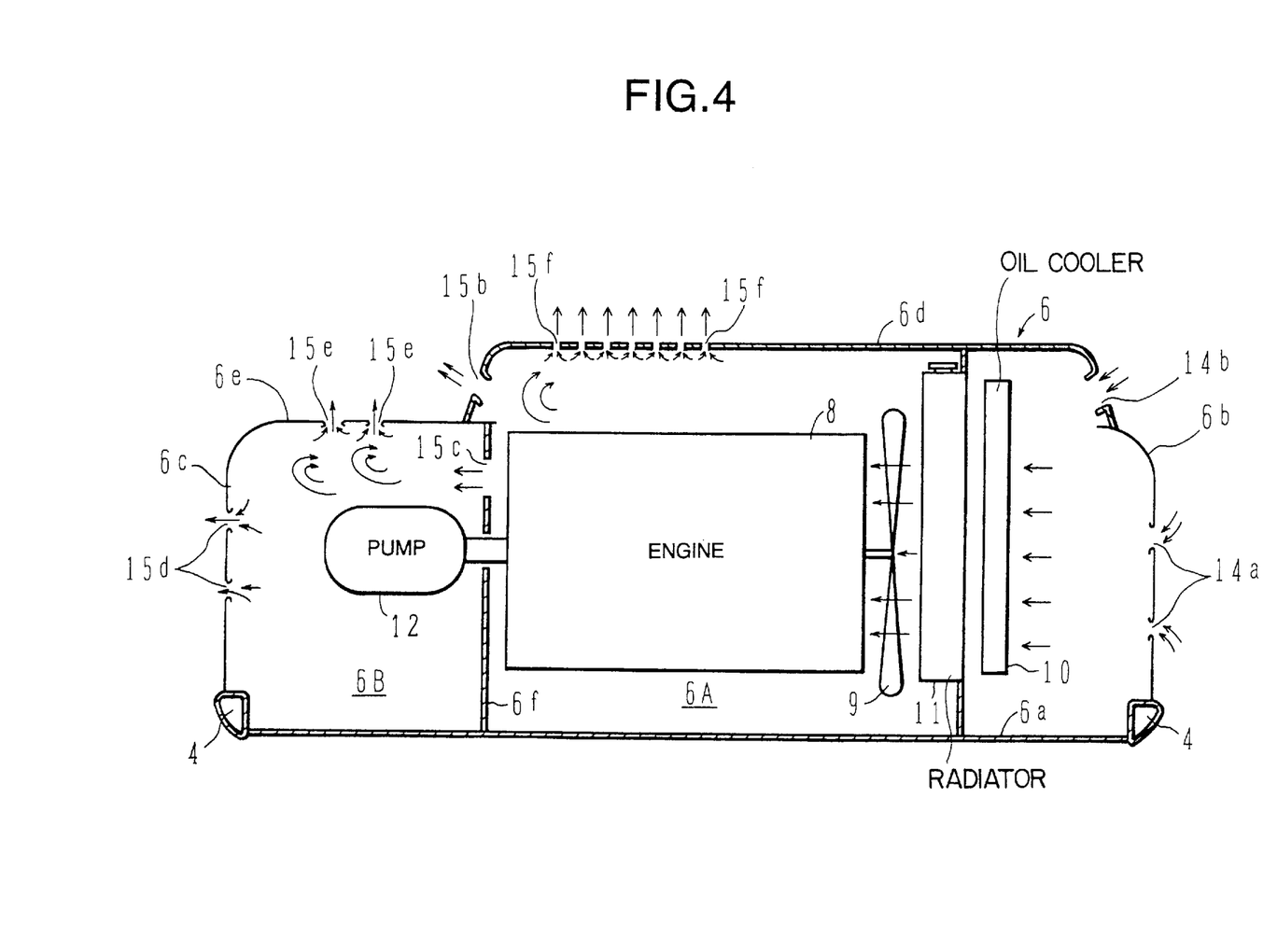
FIG. 4 is a vertical sectional view of a machine room of a hydraulic excavator with a conventional cooling structure.

For comparison, a conventional cooling structure is shown in FIG. 4. It has been conventional to bore a number of exhaust ports 15f in a portion of the engine cover 6d above a rear portion of the engine 8. In the illustrated conventional structure, the flow resistance imposed on the hot air until it is discharged through the exhaust ports 15f, 15b, 15d, 15e after passing through the engine room 6A is so large that a sufficient cooling ability cannot be obtained. Enlarging the area of the exhaust ports reduces the flow resistance, but increases the surroundings noise.

Also, because the exhaust ports 15f are holes bored in the engine cover 6d, the direction of the exhaust ports 15f is not aligned with the direction of stream of the hot air and a turbulent flow of air occurs within the engine room, resulting in poor exhaust efficiency with respect to the area of the exhaust ports. Simultaneously, turbulent flow sounds also occur. In addition, exhaust ports having a large area cannot be formed on the side of the pump room 6B, particularly, for the purpose of reducing the surroundings noise. Therefore, a turbulent flow of air occurs near the exhaust ports as well, causing turbulent flow sounds.

Results of experiments made to confirm advantages of this embodiment are as follows.

Noise Measuring Test

For a wheel type hydraulic excavator of 15 ton class, surroundings noise was measured in accordance with the noise measuring method specified in EC Standards, 89/66 EEC. As a result, an average value of the surroundings noise measured at four points in the perimeter was 77 dB for the excavator having the conventional structure shown in FIG. 4, whereas it was 72 dB for the excavator having the cooling structure of this embodiment shown in FIG. 1.

Cooling Ability Test

A wheel type hydraulic excavator of 15 ton class was run over a mountain path, and saturated temperatures of the engine cooling water and the hydraulic fluid were measured. As a result, the temperatures of the engine cooling water and the hydraulic fluid were both 62° C. in terms of difference relative to the open air temperature for the excavator having the conventional structure shown in FIG. 4, whereas both the temperatures were 55° C. in terms of difference relative to the open air temperature for the excavator having the cooling structure of this embodiment shown in FIG. 1.

From the above results, it was confirmed that the cooling structure of this embodiment succeeded in reducing the surroundings noise by 5 dB and improving the cooling ability by 7° C. as compared with the conventional structure.

According to this embodiment, as described above, because most of the cooling air having passed the fan 9 is discharged as a laminar flow through the exhaust ports 15a near the fan 9, the flow resistance is very small and the occurrence of turbulent flows at the exhaust ports 15b, 15d, 15e on the rear side is also suppressed. Consequently, the exhaust efficiency is increased and a sufficient cooling ability is achieved. In addition, the occurrence of turbulent flow sounds is suppressed and the surroundings noise is reduced.

Figure 5:
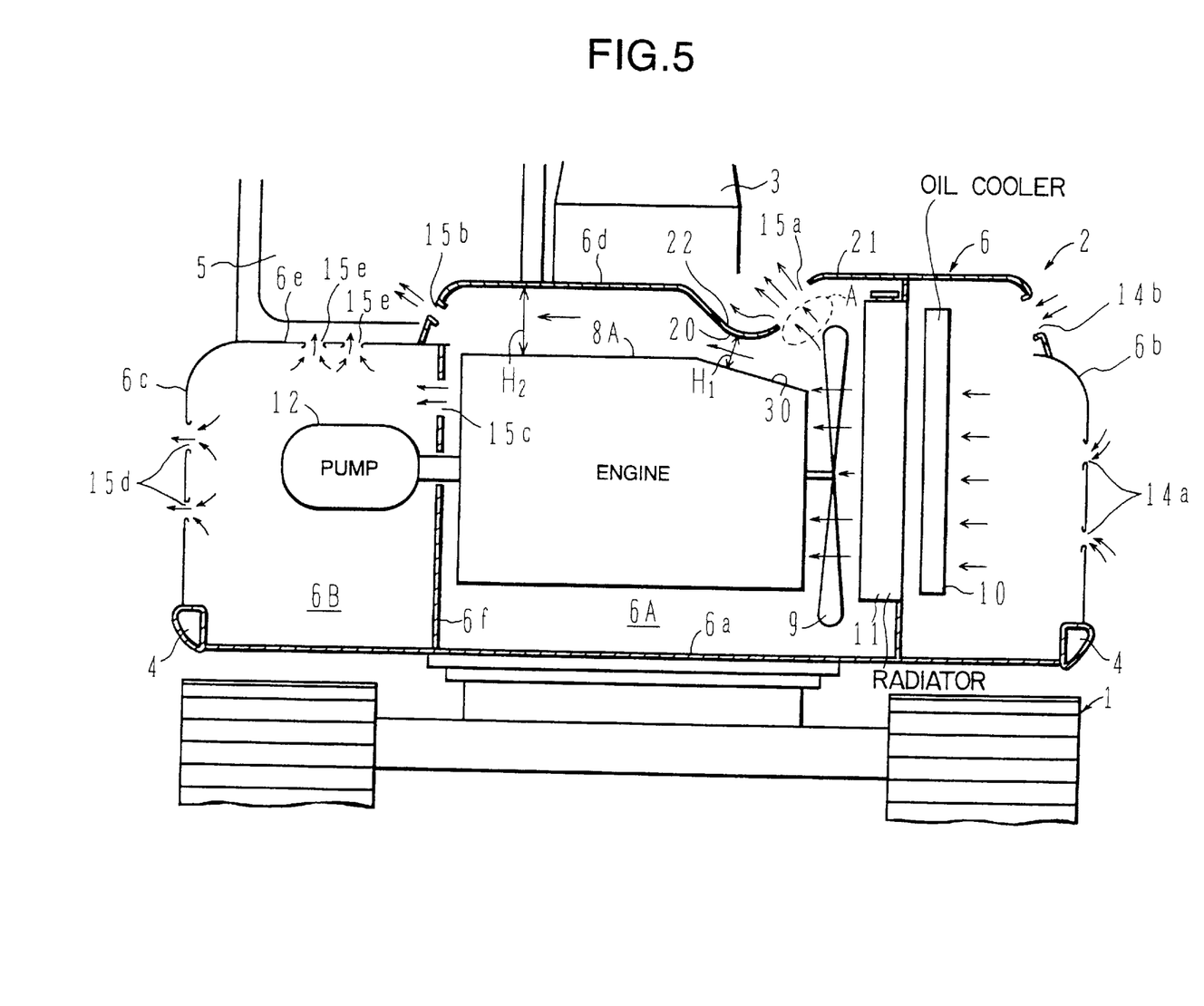
FIG. 5 is a vertical sectional view of a machine room of a hydraulic excavator with a cooling structure according to a second embodiment of the present invention.

A second embodiment of the present invention will be described with reference to FIG. 5. In FIG. 5, identical members to those shown in FIG. 1 are denoted by the same reference numerals.

Referring to FIG. 5, in the cooling structure of this embodiment, an engine 8A is cut off at its front portion obliquely to form an inclined surface 30 as shown, and the engine cover 6d is positioned closer to an upper surface of the engine 8A. Assuming now that, in FIG. 1, the distance between the upper surface of the engine 8 and the lower end of the second guide 22 (the recess 20) is h1 and the distance between the upper surface of the engine 8 and the engine cover 6d is h2 and, in FIG. 5, the distance between the inclined surface 30 of the engine 8A and the lower end of the second guide 22 (the recess 20) is H1 and the distance between the upper surface of the engine 8A and the engine cover 6d is H2, there hold relationships of H1=h1 and H2<h2.

In the present invention, while most of the cooling air from the fan 9 is discharged as a laminar flow through the exhaust ports 15a, part of the cooling air is required to flow through the passage between the upper surface of the engine 8A and the lower end of the second guide 22 (the recess 20) toward the rear side of the engine from the necessity of cooling the engine room 6A and the pump room 6B as well. To this end, a predetermined distance must be ensured between the upper surface of the engine 8A and the lower end of the second guide 22 (the recess 20).

According to this embodiment, as described above, because the same distance H1 as in the embodiment shown in FIG. 1 is ensured between the upper surface of the engine 8A and the lower end of the second guide 22 (the recess 20), a better cooling ability and a better noise reducing effect similar to those in the first embodiment can be obtained. Another advantage is that since the engine cover 6d can be located at a lower level, the field of view looking rearward from the cab 5 is improved.

Figure 6:
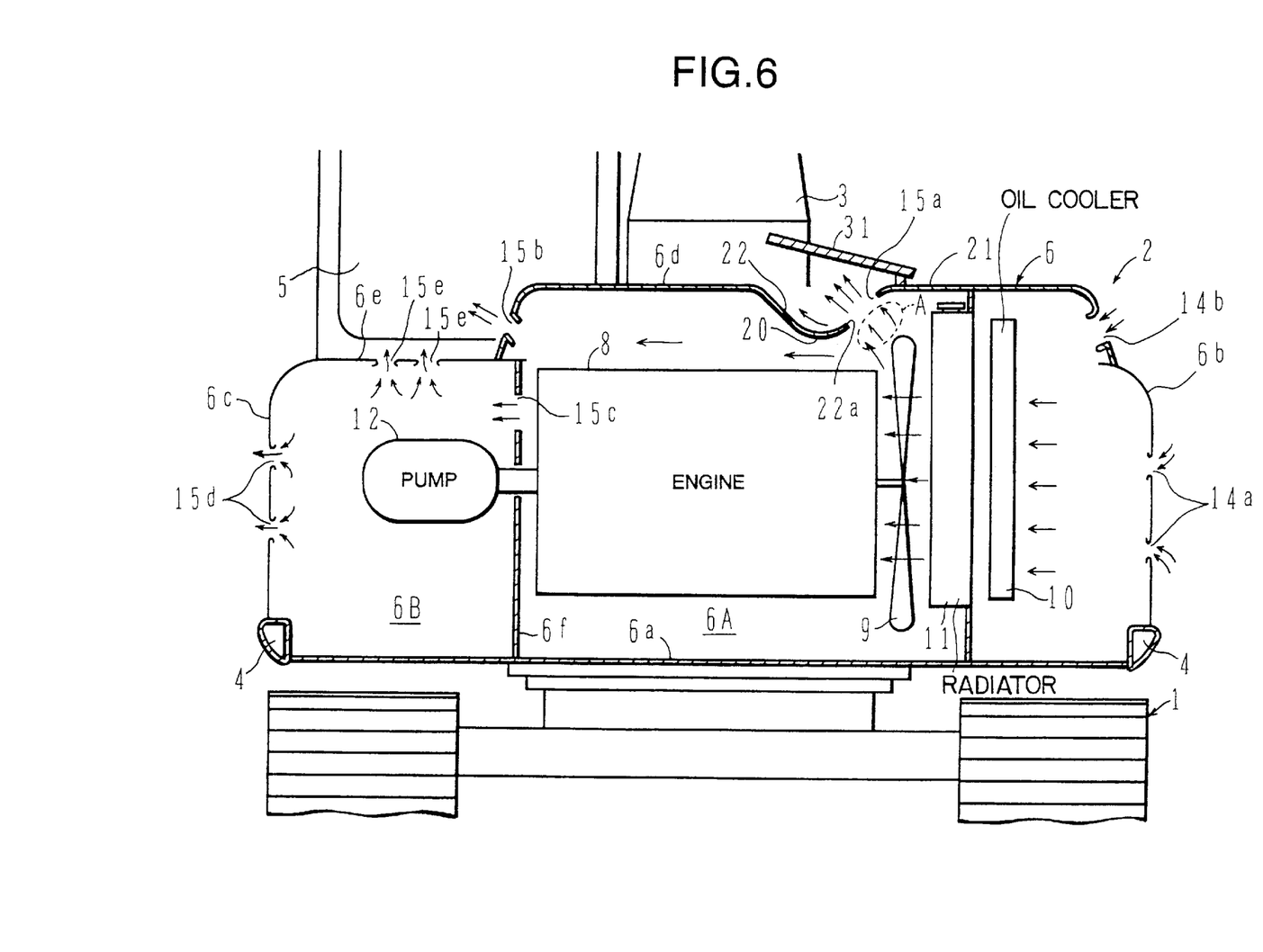
FIG. 6 is a vertical sectional view of a machine room of a hydraulic excavator with a cooling structure according to a third embodiment of the present invention.

A third embodiment of the present invention will be described with reference to FIG. 6. In FIG. 6, identical members to those shown in FIG. 1 are denoted by the same reference numerals. Referring to FIG. 6, the cooling structure of this embodiment includes, in addition to the arrangement shown in FIG. 1, a third guide 31 which is disposed outside the engine cover 6d on its upper surface near the exhaust ports 15a in opposite relation to the second guide 22 so as to cover the exhaust ports 15a. The third guide 31 is inclined such that the passage defined between the third guide 31 and the second guide 22 is gradually narrowed.

According to this embodiment thus arranged, the third guide 31 functions not only as a sound shielding plate to reduce the noise leaked through the exhaust ports 15a, but also as a cover for the exhaust ports 15a to prevent rainwater from entering the engine room 6A from above. Further, since the third guide 31 is inclined such that the passage defined between the third guide 31 and the second guide 22 is gradually narrowed, the discharged cooling air is guided as a more complete laminar flow while ensuring a sufficient opening area for discharge. As a result, the cooling ability and the noise reducing effect can be both further improved.

Figure 7:
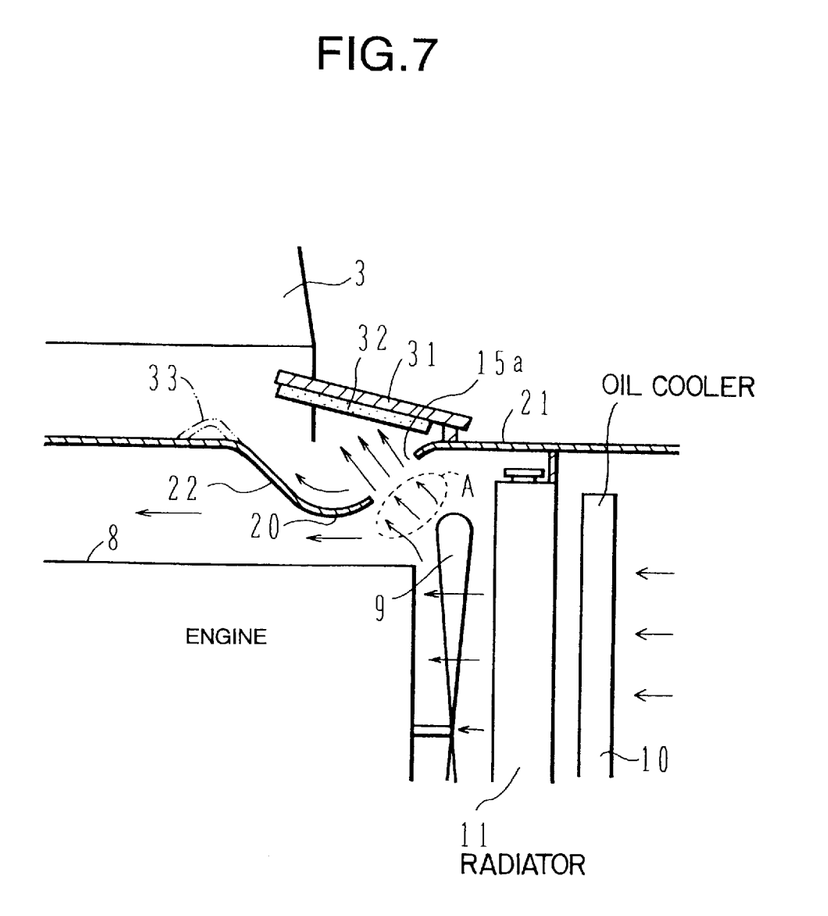
FIG. 7 is a vertical sectional view of a machine room of a hydraulic excavator with a cooling structure according to a fourth embodiment of the present invention.

A fourth embodiment of the present invention will be described with reference to FIG. 7. In FIG. 7, identical members to those shown in FIGS. 1 and 6 are denoted by the same reference numerals. Referring to FIG. 7, the cooling structure of this embodiment includes, in addition to the arrangement shown in FIG. 6, a sound absorbing material 32 made of urethane or the like stuck to the inner side of the third guide 31. This arrangement is effective in absorbing the noise leaked through the exhaust ports 15a and further improving the sound reducing effect. As indicated by imaginary lines in FIG. 7, a portion of the engine cover 6d adjacent to the second guide 22 may be raised to form a dam 33. The dam 33 serves to prevent rainwater on the engine cover 6d from entering the recess 20.

Figure 8:
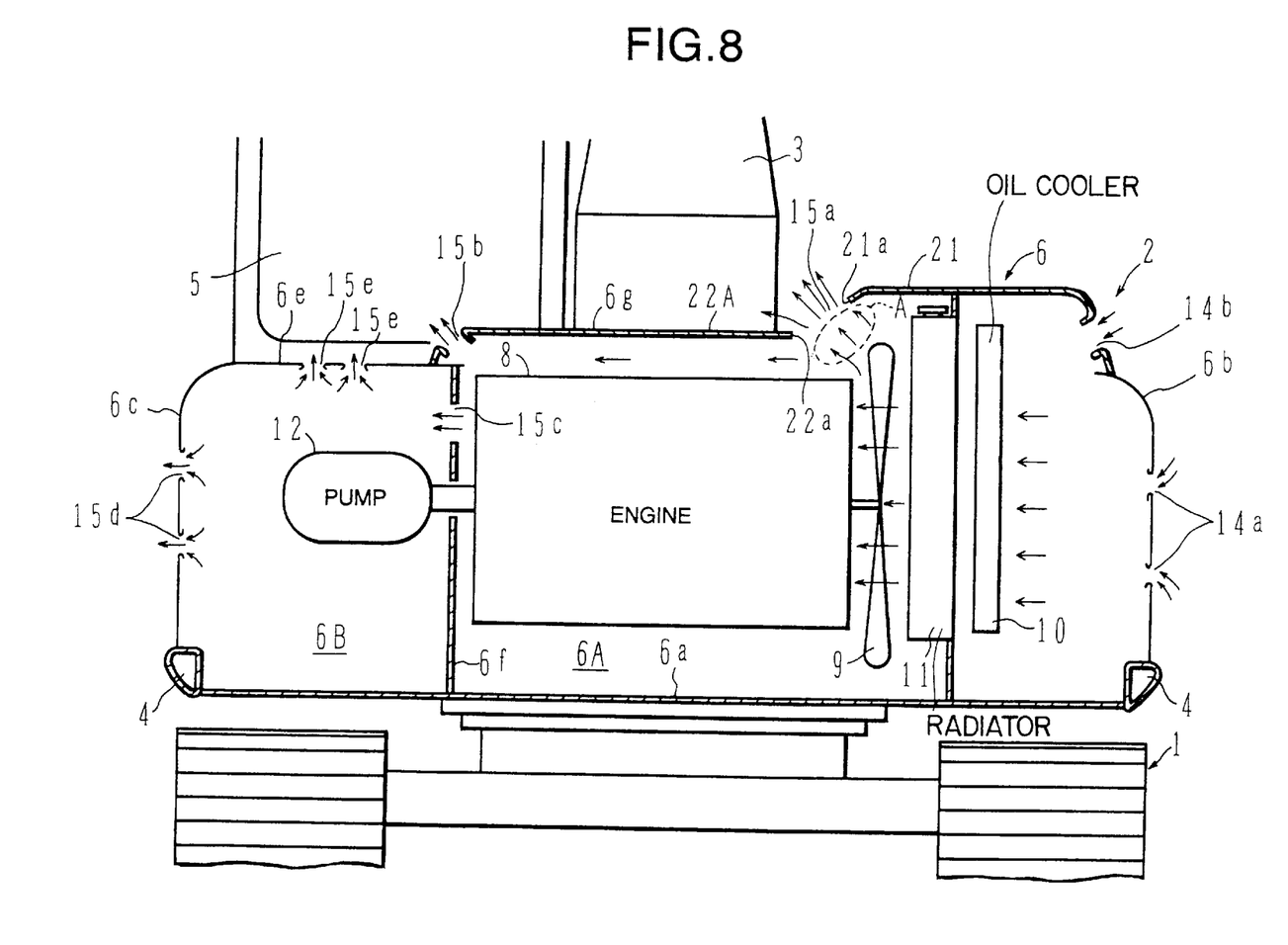
FIG. 8 is a vertical sectional view of a machine room of a hydraulic excavator with a cooling structure according to a fifth embodiment of the present invention.

A fifth embodiment of the present invention will be described with reference to FIG. 8. In FIG. 8, identical members to those shown in FIG. 1 are denoted by the same reference numerals. Referring to FIG. 8, in the cooling structure of this embodiment, an engine cover 6g is formed to be flat in its portion on the rear side of the engine from the exhaust ports 15a and, correspondingly, a second guide 22A is also formed to be flat. According to this embodiment, since the second guide 22A is not inclined, the action of guiding the cooling air discharged through the exhaust ports 15a, as a laminar flow, is lessened, but substantially the same advantages as in the embodiment of FIG. 1 are obtained except for that point. Another advantage is that since the portion of the engine cover 6g on the rear side of the engine can be located at a lower level, the field of view looking rearward from the cab 5 is improved.

According to the present invention, it is possible to minimize the occurrence of a turbulent flow of air, increase a cooling ability, and reduce surroundings noise.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a construction machine having a frame; an engine mounted on said frame in an engine compartment, said engine including a rotatable fan to draw ambient air over a radiator to cool fluid circulated therethrough, said ambient air being discharged from said radiator through a cover member forming an upper portion of said engine compartment, the improvement comprising:

exhaust ports formed in a portion of said engine cover above a front portion of said engine;

a first guide positioned radially outside said fan for guiding the ambient air just after having passed said fan;

a second guide positioned above the front portion of said engine for guiding the ambient air discharged through said exhaust ports, said second guide having a distal end positioned lower than said first guide, said exhaust ports being each positioned between the distal end of said second guide and a distal end of said first guide across which the ambient air flows; and wherein a recess is formed in the portion of said engine cover above the front portion of said engine, said exhaust ports are formed in a slope of said recess on the same side of the engine cover as said fan, and an opposite slope of said recess serves as said second guide.

2. The construction machine according to claim 1, wherein said second guide is inclined downward toward said fan.

3. The construction machine according to claim 2, wherein the front portion of said engine is cut off obliquely whereby said engine cover is positioned closer to an upper surface of said engine than a remaining portion of said engine.

4. The construction machine according to claim 1, wherein said first guide is constituted by a portion of said engine cover which is positioned radially outside said fan.

5. The construction machine according to claim 1, wherein a sound shielding partition is provided between said exhaust ports in said engine cover and a rear portion of a machine body.

6. The construction machine according to claim 1, wherein said recess is formed except for a portion of said engine cover adjacent to the rear portion of a machine body of said construction machine, and the portion of said engine cover adjacent to the rear portion of said machine body serves as a sound shielding partition.

7. The construction machine according to claim 1, wherein a third guide is provided outside said engine cover on its upper surface near said exhaust ports so as to cover said exhaust ports.

8. The construction machine according to claim 7, wherein said third guide is inclined such that a passage defined between said third guide and said second guide is gradually narrowed.

9. The construction machine according to claim 7, wherein a sound absorbing material is attached to an inner side of said third guide.

* * * * *